(12) United States Patent
Wang

(10) Patent No.: US 8,242,419 B2
(45) Date of Patent: Aug. 14, 2012

(54) AQUARIUM HEATER

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 922 days.

(21) Appl. No.: 12/328,019

(22) Filed: Dec. 4, 2008

(65) Prior Publication Data

US 2010/0140254 A1 Jun. 10, 2010

(51) Int. Cl.
*H05B 3/02* (2006.01)
*F24H 1/18* (2006.01)

(52) U.S. Cl. ........................... 219/523; 392/441
(58) Field of Classification Search .................. 219/523, 219/538–542, 544–549; 392/441, 451, 497, 392/500–503; 338/22 R, 231, 235, 238–246
See application file for complete search history.

(56) References Cited

U.S. PATENT DOCUMENTS

| | | | | |
|---|---|---|---|---|
| 4,147,927 A | * | 4/1979 | Pirotte | 219/541 |
| 4,378,488 A | * | 3/1983 | Jager | 219/523 |
| 6,097,007 A | | 8/2000 | Wang | |
| 7,293,914 B2 | | 11/2007 | Wang | |

* cited by examiner

*Primary Examiner* — Sang Park
(74) *Attorney, Agent, or Firm* — Guice Patents PLLC

(57) ABSTRACT

An aquarium heater including a tubular plastic housing that houses a positive temperature coefficient element and two metal radiation fins and filled up with a thermal conductive filler, and a top cover capped on the tubular plastic housing to hold a power cable for transmitting electricity to the positive temperature coefficient element to generate heat. Because of the positive temperature coefficient element, no temperature control loop is necessary for controlling the temperature level. Further, the aquarium heater has a self-protection function because of the positive temperature coefficient element.

6 Claims, 4 Drawing Sheets

AQUARIUM HEATER

BACKGROUND OF THE INVENTION

1. Field of the Invention

The present invention relates to aquariums and more specifically, to an aquarium heater for aquarium, which uses positive temperature coefficient element as a heat source to keep water warm.

2. Description of the Related Art

To keep the water in an aquarium warm, a heater is usually used. A conventional heater for this purpose generally comprises a ceramic coil holder, a heating coil wound round the ceramic coil holder, and a housing surrounding the ceramic coil holder and the heating coil. When the heating coil is electrically connected to generate heat, heat energy is transferred through the housing to the water in the aquarium. Similar designs are seen in U.S. Pat. No. 7,293,914, entitled "Temperature detecting heater with indicating structure for aquarium", and U.S. Pat. No. 6,097,007, entitled "Aquarium water temperature controller", both issued to the present inventor.

Convention heating coil type heater designs need a circuit board with a temperature control loop to avoid overheating. The installation of this temperature control loop increases the dimension of the heater and complicates its installation procedure, resulting in a high cost.

A bimetal temperature switch may be used with an aquarium heater as foolproof means. However, the foolproof action may fail due to a contact failure (such as short circuit), causing an accident. An improvement in this regard is necessary.

PTC (Positive temperature coefficient) materials that experience an increase in electrical resistance when their temperature is raised. The higher the coefficient, the greater an increase in electrical resistance for a given temperature increase. Therefore, the heating temperature of a PTC element is constant. PTC materials have been intensively used in heaters for electric mosquito repeller and starters for refrigerators where a constant temperature level is required. Therefore, it is the scope of discussion to apply a PTC element to an aquarium heater for a better performance.

SUMMARY OF THE INVENTION

The present invention has been accomplished under the circumstances in view.

According to the present invention, the aquarium heater comprises a tubular plastic housing, a positive temperature coefficient element mounted in the tubular plastic housing at the longitudinal center, and a top cover capped on the tubular plastic housing to hold a power cable for transmitting electricity to the positive temperature coefficient element to generate heat. By means of the functioning of the positive temperature coefficient element, no temperature control loop is necessary for controlling the temperature level and therefore the size and manufacturing cost of the aquarium heater can be greatly reduced. Further, subject to the functioning of the positive temperature coefficient element, the aquarium heater has a self-protection function, achieving excellent foolproof effect.

Further, metal radiation fins set around the positive temperature coefficient element in the tubular plastic housing, and a thermal conductive filler, for example, magnesium oxide is put in the tubular plastic housing to fill up the gap, assuring distribution of heat energy out of the aquarium heater into the water in an aquarium evenly in which the aquarium heater is installed.

Further, anchoring means, for example, vacuum mounts are used for fastening the tubular plastic housing to the inside wall of the plastic housing of an aquarium.

DETAILED DESCRIPTION OF THE PREFERRED EMBODIMENT

Figure 1:
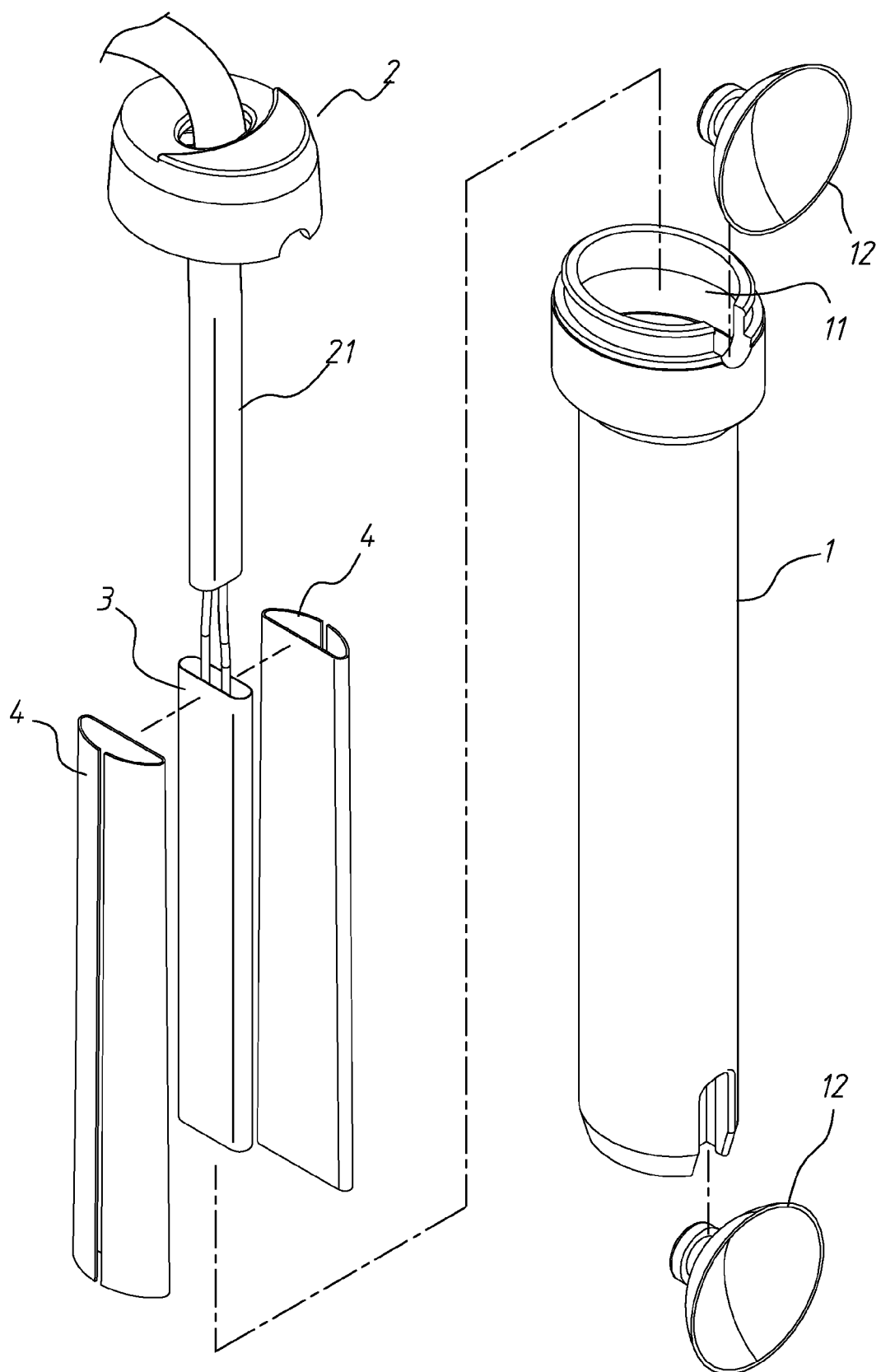
FIG. 1 is an exploded view of an aquarium heater in accordance with the present invention.
Figure 2:
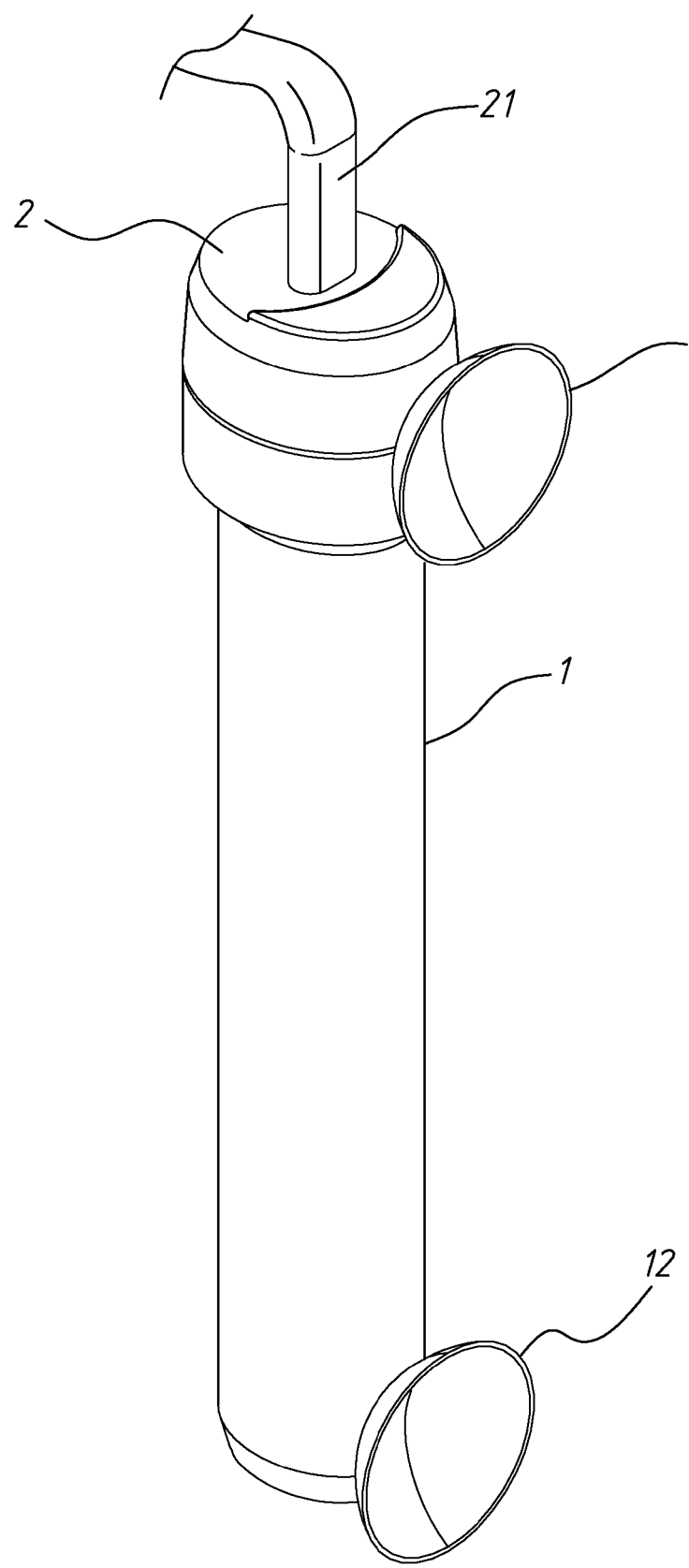
FIG. 2 is an elevational view of the aquarium heater in accordance with the present invention.
Figure 3:
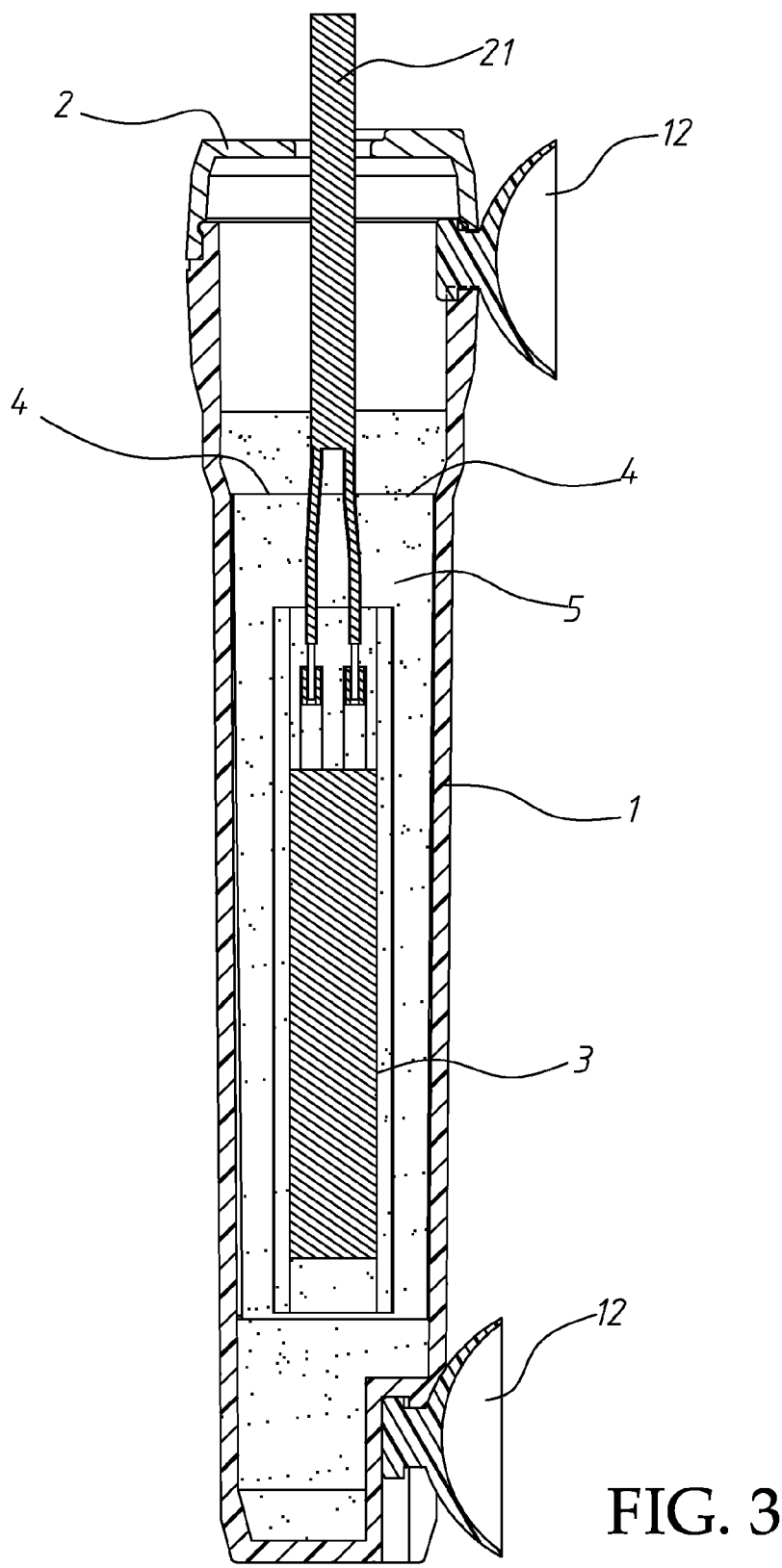
FIG. 3 is a sectional view of the aquarium heater in accordance with the present invention.

Referring to FIGS. 1~3, an aquarium heater comprises a tubular plastic housing 1, a top cover 2, a PTC (positive temperature coefficient) element 3, metal radiation fins 4, and a thermal conductive filler 5.

The tubular plastic housing 1 has its bottom side closed, an opening 11 in its top side, and anchoring means, for example, vacuum mounts 12 provided near the top and bottom sides for securing the tubular plastic housing 1 to the inner surface of the plastic housing of an aquarium.

The top cover 2 closes the opening 11 of the tubular plastic housing 1, having a power cable 21 inserted therethrough to the inside of the tubular plastic housing 1 in a watertight manner.

The PTC (positive temperature coefficient) element 3 is axially mounted in the longitudinal center of the tubular plastic housing 1 and electrically connected to the power cable 21. When electric current is transmitted from a power source to the PTC positive temperature coefficient) element 3 through the power cable 21, the PTC (positive temperature coefficient) element 3 generate heat at a constant level subject to its composition match. The PTC element 3 can have an elongated shape and a cross section having two opposing curved ends and two opposing flat surfaces located between the two opposing curved ends.

The metal radiation fins 4 are arranged at two opposite sides of the PTC (positive temperature coefficient) element 3. According to the present preferred embodiment, the metal radiation fins 4 are made of copper, and shaped like a semi-circular tube. The metal radial fins 4 can have a D-shaped cross section with a flat surface and a curved surface located opposite the flat surface. The curved surface of each metal radial fin 4 can have an opening located on a middle portion and extending a length of each metal radial fin 4. The flat surface of each metal radial fin 4 can be located adjacent to a corresponding flat surface of the PTC element 3 with the opening of each metal radial fin 4 located adjacent to an interior surface of the tubular plastic housing 1. It is to be understood that the metal radiation fins 4 can be made of any other thermal conductivity material in any other shape.

Further, as shown in FIG. 3, a thermal conductive filler 5 fills up the space in the tubular plastic housing 1. The thermal conductive filler 5 can be magnesium oxide.

Figure 4:
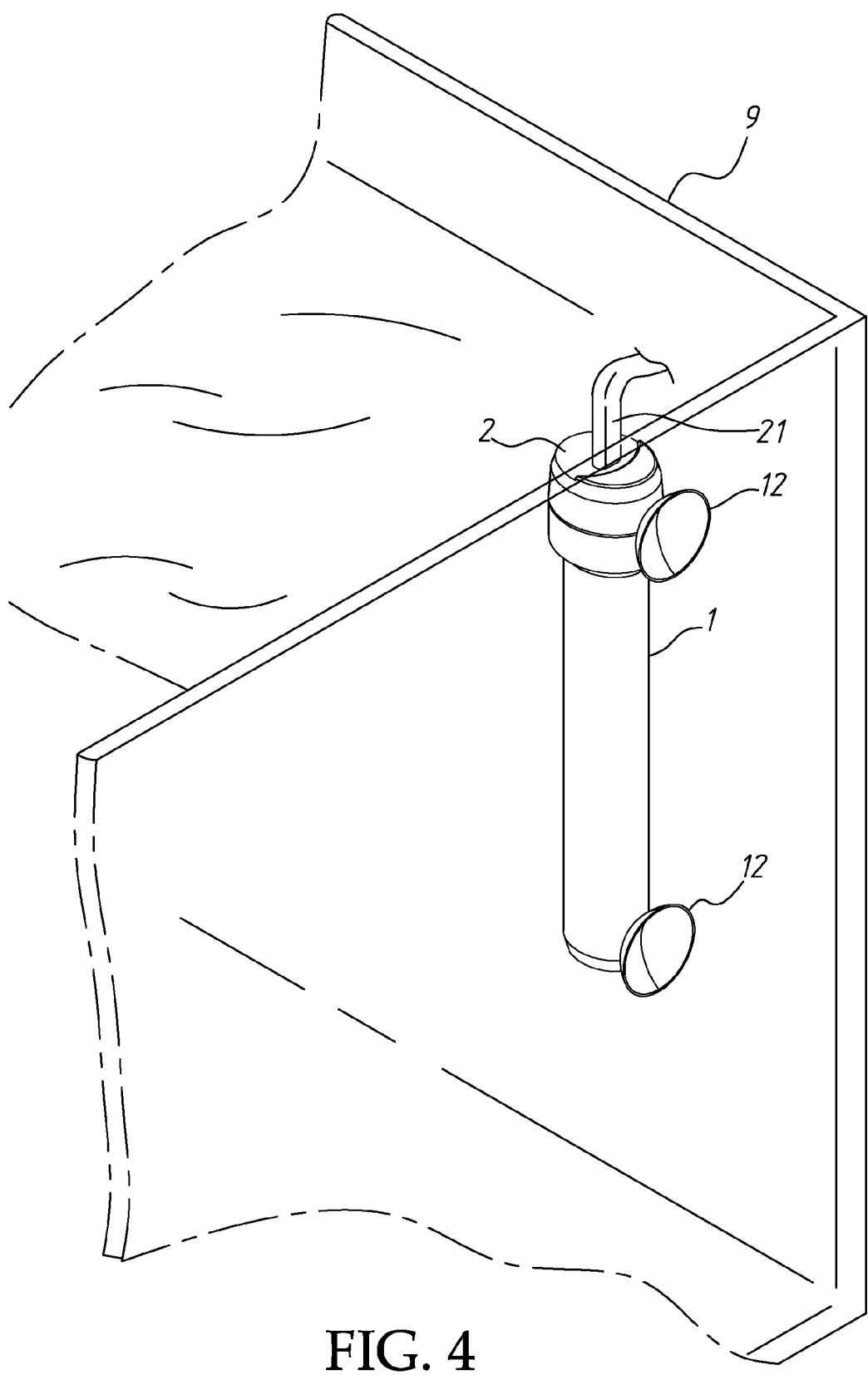
FIG. 4 is a schematic drawing showing the aquarium heater used in an aquarium according to the present invention.

Referring to FIG. 4, the use of the aquarium heater is quite simple. The vacuum mounts 12 are fastened to the inner surface of the glass housing of an aquarium 9, keeping the tubular plastic housing 1 submerged in water. Thereafter, the power cable 21 is connected to power source, causing the PTC (positive temperature coefficient) element 3 to generate heat. When the temperature of the PTC (positive temperature coefficient) element 3 reaches a predetermined level, the electrical resistance is increased, and the heating power is relatively lowered, and therefore the heating temperature is kept constant. Thus, it is not necessary to use a circuit board with a temperature control loop for controlling the temperature level of the aquarium heater, i.e., the size and manufacturing cost of the aquarium heater are greatly reduced. Further, subject to the functioning of the PTC (positive temperature coefficient) element 3, the aquarium heater has a self-protection function, achieving excellent foolproof effect.

Further, the assembly process of the aquarium heater is rapid and simple. During the assembly process of the aquarium heater, the PTC (positive temperature coefficient) element 3 is connected to the power cable 21 and then mounted with the metal radiation fins 4 in the tubular plastic housing 1, and then the thermal conductive filler 5 is filled in the tubular plastic housing 1, and then the top cover 2 is capped on the opening 11 of the tubular plastic housing 1.

A prototype of aquarium heater has been constructed with the features of FIGS. 1~4. The aquarium heater functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An aquarium heater for an aquarium comprising:
   a tubular plastic housing having a closed bottom side and an opening in a top side thereof;
   an anchoring device connecting said tubular plastic housing to an inside wall of the aquarium;
   a top cover adapted to close said opening of said tubular plastic housing;
   a power cable inserted through said top cover in a watertight manner and suspending in said tubular plastic housing;
   a positive temperature coefficient element electrically connected to said power cable and longitudinally positioned in the longitudinal center of said tubular plastic housing for generating heat when said power cable is electrically connected to a power source;
   two metal radiation fins, each metal radiation fin of the two radiation fins has a shape of a semi-circular tube including a flat surface and a curved surface, each curved surface of the metal radiation fin has an opening located at a middle section of the curved surface and extending a length of the metal radiation fin, said positive temperature coefficient element is located between the two metal radiation fins; and
   a thermal conductive filler filled in said tubular plastic housing around said positive temperature coefficient element and said two metal radiation fins.

2. The aquarium heater as claimed in claim 1, wherein said thermal conductive filler is magnesium oxide.

3. The aquarium heater as claimed in claim 1, wherein said anchoring device comprises two vacuum mounts provided at the periphery of said tubular plastic housing near top and bottom sides of said tubular plastic housing.

4. The aquarium heater as claimed in claim 1, wherein said metal radiation fins are made of copper.

5. The aquarium heater as claimed in claim 1, wherein the positive temperature coefficient element has an elongated shape and a cross section having two opposing curved ends and two opposing flat surfaces located between the two opposing curved ends.

6. The aquarium heater as claimed in claim 1, wherein the opening in the curved surface of each metal radiation fin of the two radiation fins is located adjacent to an interior surface of the tubular plastic housing and the flat surface of each metal radiation fin of the two radiation fins is located adjacent to a corresponding flat surface of the positive temperature coefficient element.

* * * * *